US012542081B2

(12) United States Patent
Wen et al.

(10) Patent No.: US 12,542,081 B2
(45) **Date of Patent: *Feb. 3, 2026**

(54) PREDICTIVE GAMMA ALGORITHM FOR MULTIPLE DISPLAY REFRESH RATES

(71) Applicant: Google LLC, Mountain View, CA (US)

(72) Inventors: Chien-Hui Wen, Cupertino, CA (US); Hsin-Yu Chen, Taoyuan (TW); Ken Kok Foo, Sunnyvale, CA (US); John William Kaehler, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,189

(22) Filed: Dec. 26, 2024

(65) Prior Publication Data

US 2025/0273110 A1 Aug. 28, 2025

Related U.S. Application Data

(63) Continuation of application No. 17/998,227, filed as application No. PCT/US2021/033978 on May 25, 2021, now Pat. No. 12,183,235.

(60) Provisional application No. 63/049,042, filed on Jul. 7, 2020.

(51) Int. Cl.
*G09G 3/20* (2006.01)

(52) U.S. Cl.
CPC ....... *G09G 3/20* (2013.01); *G09G 2320/0247* (2013.01); *G09G 2320/0626* (2013.01); *G09G 2320/0673* (2013.01); *G09G 2340/0435* (2013.01); *G09G 2360/16* (2013.01)

(58) Field of Classification Search
CPC ............. G09G 3/20; G09G 2320/0247; G09G 2320/0626; G09G 2320/0673; G09G 2340/0435; G09G 2360/16
See application file for complete search history.

(56) References Cited

U.S. PATENT DOCUMENTS

| | | | | |
|---|---|---|---|---|
| 2007/0097107 A1* | 5/2007 | Furukoshi | G09G 3/3648 | 345/204 |
| 2008/0117142 A1* | 5/2008 | Lin | G09G 3/3225 | 345/84 |
| 2017/0243548 A1* | 8/2017 | Wang | G09G 3/20 | |
| 2018/0090084 A1* | 3/2018 | Zheng | G09G 3/3614 | |

* cited by examiner

*Primary Examiner* — Kirk W Hermann
(74) *Attorney, Agent, or Firm* — McDonnell Boehnen Hulbert & Berghoff LLP

(57) ABSTRACT

A method may include measuring, from a device having a display panel configured to operate at a first refresh rate or a second refresh rate, a difference in luminance of the display panel between the first refresh rate and the second refresh rate for an input gray level. The method may also include applying, based on the measured difference in luminance, a value offset to a default gamma value used by the device for the input gray level when the display panel is operating at the second refresh rate, thereby generating a new gamma value. The method may further include storing, at the device, the new gamma value, where subsequent to the storing, the device is configured to override the default gamma value for the input gray level with the new gamma value when the display panel is operating at the second refresh rate.

23 Claims, 7 Drawing Sheets

400

402

60Hz Gamma Brightness Adjustments

| | | Tap | | | | | | | | | |
|---|---|---|---|---|---|---|---|---|---|---|---|
| DVB Band | Luminance | G255 | G216 | G160 | G91 | G54 | G37 | G24 | G12 | G7 | DVB Band |
| 7 | 500nits | 500 | 347.04 | 51.81 | 16.43 | 16.43 | 8.33 | 2.33 | 0.6 | 0.172 | 500nits |
| | | G255 | | G182 | G107 | G73 | G48 | G23 | G15 | G7 | |
| 6 | 110nits | 110 | | 52.37 | 16.28 | 7.02 | 2.791 | 0.553 | 0.311 | 0.03 | 110nits |
| 5 | 50nits | 50 | | 23.8 | 7.4 | 3.191 | 1.269 | 0.251 | 0.097 | 0.017 | 50nits |
| 4 | 25nits | 25 | | 11.9 | 3.7 | 1.595 | 0.123 | 0.126 | 0.023 | 0.007 | 25nits |
| 3 | 10 nits | 10 | | 4.76 | 1.48 | 0.638 | 0.222 | 0.45 | 0.234 | 0.0039 | 10 nits |
| 2 | 5 nits | 5 | | 2.38 | 0.74 | 0.123 | 0.123 | 0.032 | 0.022 | 0.0018 | 5 nits |
| 1 | 2 nits | 2 | | 0.952 | 0.2212 | 0.333 | 0.02 | 0.002 | 0.0003 | 0.00009 | 2 nits |

410

412

90Hz Gamma Brightness Adjustments

| | | Tap | | | | | | | | | |
|---|---|---|---|---|---|---|---|---|---|---|---|
| DVB Band | Luminance | G255 | G216 | G160 | G91 | G54 | G37 | G24 | G12 | G7 | DVB Band |
| 7 | 500nits | 500 | 347.04 | 51.81 | 16.43 | 16.43 | 7.15 | 2.76 | 0.6 | 0.184 | 500nits |
| | | G255 | | G182 | G107 | G73 | G48 | G23 | G15 | G7 | |
| 6 | 110nits | 110 | | 52.37 | 16.28 | 7.02 | 2.791 | 0.553 | 0.216 | 0.04 | 110nits |
| 5 | 50nits | 50 | | 23.8 | 7.4 | 3.191 | 1.269 | 0.251 | 0.098 | 0.018 | 50nits |
| 4 | 25nits | 25 | | 11.9 | 3.7 | 1.595 | 0.634 | 0.126 | 0.049 | 0.009 | 25nits |
| 3 | 10 nits | 10 | | 4.76 | 1.48 | 0.638 | 0.254 | 0.05 | 0.02 | 0.004 | 10 nits |
| 2 | 5 nits | 5 | | 2.38 | 0.74 | 0.319 | 0.127 | 0.025 | 0.01 | 0.002 | 5 nits |
| 1 | 2 nits | 2 | | 0.952 | 0.296 | 0.128 | 0.01 | 0.01 | 0.0004 | 0.0001 | 2 nits |

Figure 4

600

602

604

*DL= Delta Luminance between 60 and 90Hz

| | Tap | | | | | | | | | |
|---|---|---|---|---|---|---|---|---|---|---|
| DVB Band | G255 | G316 | G160 | G91 | G54 | G37 | G24 | G12 | G7 | DVB Band |
| 500nits | -0.03543 | 0.02603 | 0.9062 | 0.4791 | 0.6523 | 0.2143 | 1.335 | -0.6229 | -3.836 | 500nits |
| | | | G255 | G182 | G107 | G73 | G46 | G23 | G15 | |
| 110nits | | | -0.4898 | -0.2186 | -0.07622 | -1.265 | 1.434 | -4.431 | 0.02475 | 110nits |
| 50nits | | | -0.5232 | -0.7499 | 1.524 | 4.019 | -1.830 | -6.483 | -3.767 | 50nits |
| 25nits | | | 0.03116 | -0.2537 | -0.9315 | -1.726 | -0.9432 | -8.741 | 15.646 | 25nits |
| 10 nits | | | -0.9298 | -2.649 | -8.869 | -3.556 | 1.022 | 49.15 | 44.37 | 10 nits |
| 5 nits | | | 1.116 | -3.99 | 0.03813 | -0.7506 | -7.641 | -1.803 | 12.67 | 5 nits |
| 2 nits | | | -0.4305 | -0.8472 | 0.4341 | -2.461 | -1.568 | 24.77 | 65.15 | 2 nits |

Offset table:

| | |
|---|---|
| DL < -22 | G+3 |
| -22 ≤ DL < -12.5 | G+2 |
| -12.5 ≤ DL ≤ -5 | G+1 |
| 5 ≤ DL ≤ 12.5 | G-1 |
| 12.5 < DL ≤ 22 | G-2 |
| DL > 22 | G-3 |

610

| | |
|---|---|
| DL < -22 | G+3 |
| -22 ≤ DL < -15.5 | G+2 |
| -15.5 ≤ DL < -13 | G+1 |
| -13 ≤ DL ≤ -5 | G+1,R-1,B-1 |
| 5 ≤ DL ≤ 8 | G-1,R+1,B+1 |
| 8 ≤ DL ≤ 12.5 | G-1 |
| 12.5 < DL ≤ 25 | G-2 |
| 24 < DL ≤ 30 | G-2,R-1,B-1 |
| DL > 30 | G-3 |

620

| | |
|---|---|
| DL < -22 | G+3 |
| -22 ≤ DL < -15.5 | G+2 |
| -15.5 ≤ DL < -8 | G+1 |
| -8 ≤ DL ≤ -5 | G+1,R-1,B-1 |
| 5 ≤ DL ≤ 8 | G-1,R+1,B+1 |
| 8 ≤ DL ≤ 12.5 | G-1 |
| 12.5 < DL ≤ 16 | G-1, B-1 |
| 16 < DL ≤ 21 | G-2,R+2,B-+2 |
| 21 < DL ≤ 25 | G-2,R+1,B-+1 |
| 25 < DL ≤ 35 | G-2,R+1 |
| DL >35 | G-2 |

630

| | |
|---|---|
| DL < -22 | G+2 |
| -22 ≤ DL < -7 | G+1,R-1,B-1 |
| 7 ≤ DL ≤ 14 | G-1, R+1, B+1 |
| 14 < DL ≤ 22 | G-1 (R-1,B-1) |
| 22 < DL ≤ 30 | G-2 |
| 30 < DL ≤ 40 | G-2, R-1, B-1 |
| 40 < DL ≤ 45 | G-2, R-2, B-2 |
| 45 < DL ≤ 50 | G-2,R-3, B-3 |
| DL >50 | G-3 |

640

Figure 6

PREDICTIVE GAMMA ALGORITHM FOR MULTIPLE DISPLAY REFRESH RATES

CROSS-REFERENCE TO RELATED APPLICATIONS/INCORPORATION BY REFERENCE

This application is a continuation of U.S. patent application Ser. No. 17/998,227, filed Nov. 8, 2022, which claims priority to International Patent Application No. PCT/US2021/033978, filed May 25, 2021, which claims priority to U.S. Provisional Patent Application No. 63/049,042, filed on Jul. 7, 2020, which are hereby incorporated by reference in their entirety.

BACKGROUND

A refresh rate may refer to the number of times per second at which an image refreshes on a display panel of a device. For example, a refresh rate of 60 Hertz (Hz) means that an image is refreshed 60 times per second. Higher refresh rates typically lead to better user experiences, but also result in higher power usage for the device.

Sometimes, a display panel can operate at multiple refresh rates. For example, when executing a video streaming application, a device may set the refresh rate of a display panel to 90 Hz, whereas when executing a word processing application, the device may set the refresh rate of the display panel to 60 Hz.

SUMMARY

The present disclosure generally relates to a display panel of a device. The display panel may be configured to operate at a first refresh rate or a second refresh rate. Depending on a measured difference in luminance or a measured difference in color of the display panel between the first refresh rate and the second refresh rate, the device may be configured to override a default gamma value with a new gamma value when the display panel is operating at the second refresh rate.

In a first aspect, a method is provided. The method may include measuring, from a device having a display panel configured to operate at a first refresh rate or a second refresh rate, at least one of a difference in luminance or a difference in color of the display panel between the first refresh rate and the second refresh rate for an input gray level. The method may also include applying, based on the at least one measured difference, a value offset to a default gamma value used by the device for the input gray level when the display panel is operating at the second refresh rate, thereby generating a new gamma value. The method may further include storing, at the device, the new gamma value, where subsequent to the storing, the device is configured to override the default gamma value for the input gray level with the new gamma value when the display panel is operating at the second refresh rate In a second aspect, a system is provided. The system may include one or more processors. The system may also include data storage, where the data storage has stored thereon computer-executable instructions that, when executed by the one or more processors, cause the system to carry out operations. The operations may include measuring, from a device having a display panel configured to operate at a first refresh rate or a second refresh rate, at least one of a difference in luminance or a difference in color of the display panel between the first refresh rate and the second refresh rate for an input gray level. The operations may also include applying, based on the at least one measured difference, a value offset to a default gamma value used by the device for the input gray level when the display panel is operating at the second refresh rate, thereby generating a new gamma value. The operations may further include providing instructions to the device to override the default gamma value for the input gray level with the new gamma value when the display panel is operating at the second refresh rate.

In a third aspect, a device is provided. The device may include a display panel configured to operate at a first refresh rate or a second refresh rate. The device may also include one or more processors configured to receive at least one of a measured difference in luminance or a measured difference in color of the display panel between the first refresh rate and the second refresh rate for an input gray level. The one or more processors may also be configured to apply, based on the at least one measured difference, a value offset to a default gamma value used by the device for the input gray level when the display panel is operating at the second refresh rate, thereby generating a new gamma value. The one or more processors may further be configured to store the new gamma value, where subsequent to the storing, the device is configured to override the default gamma value for the input gray level with the new gamma value when the display panel is operating at the second refresh rate.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 4 depicts gamma tables, in accordance with example embodiments.

FIG. 6 depicts offset tables, in accordance with example embodiments.

DETAILED DESCRIPTION

Figure 1:
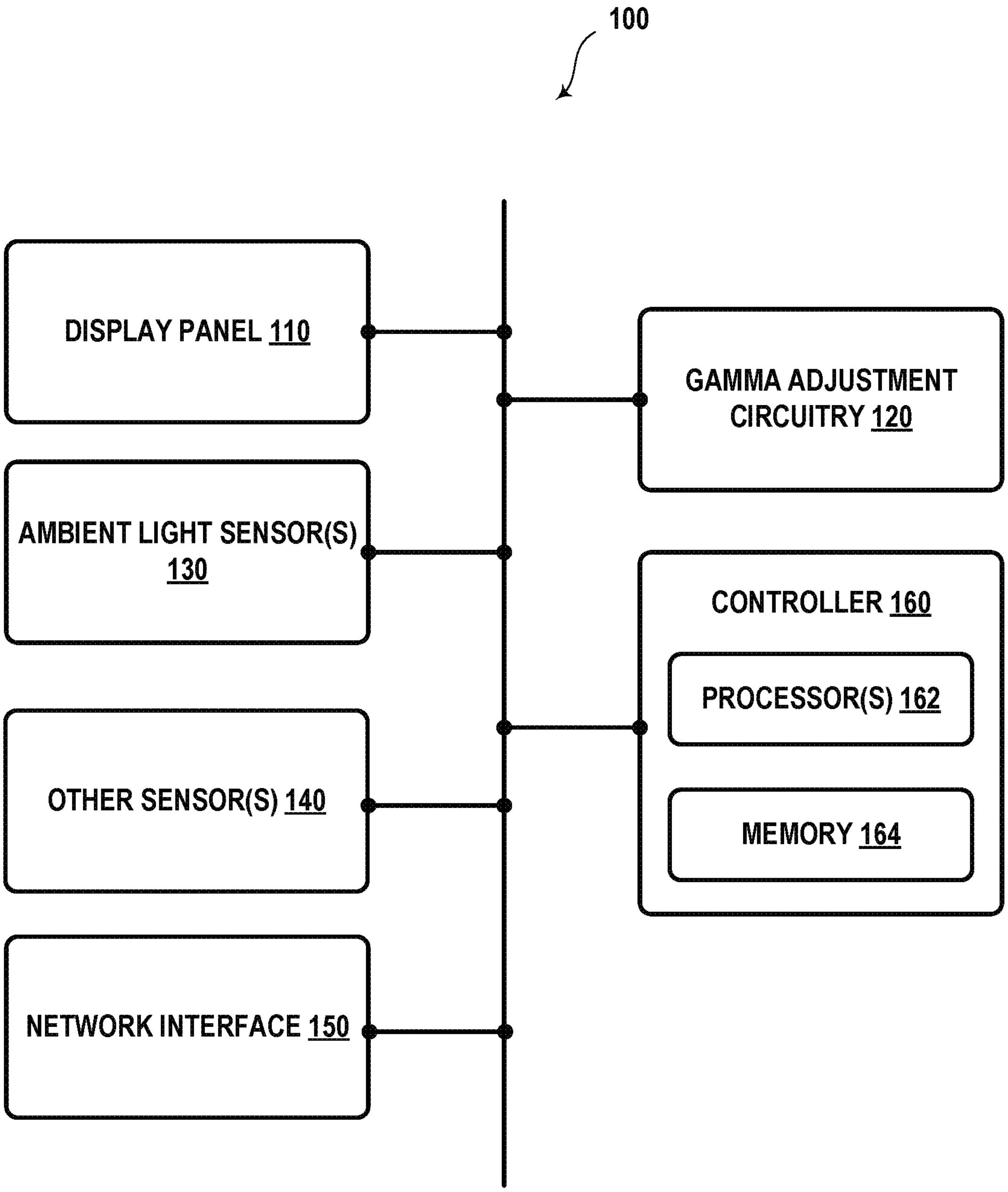
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

High display refresh rates (e.g., 90 Hz or 120 Hz) for a display panel of a computing device may be desirable when executing visually complex software applications, such as video or gaming applications. However, higher refresh rates also cause the computing device to consume more power. To strike a balance between performance and battery life, some display panels can operate at one of multiple different refresh rates (e.g., 60 Hz and 90 Hz). That is, depending on the application being executed, the display panel can switch between a 60 Hz and a 90 Hz refresh rate.

However, optical characteristics may differ between 60 Hz and 90 Hz refresh rates. Specifically, the luminance and color of the display panel may differ between 60 Hz and 90 Hz. When the display panel switches from 60 Hz to 90 Hz (and vice versa), this optical difference may manifest itself as a visual flicker on the display panel. Consequently, if the display panel frequently switches between 60 Hz and 90 Hz refresh rates, the visual flicker may become highly pronounced and detrimental to a user's experience. Further, because human eyes are highly sensitive to changes at low luminance settings, the visual flicker is especially noticeable when the luminance of the display panel is low and/or when the ambient light of the environment surrounding the display panel is low.

Some solutions attempt to solve this "flicker problem" by disabling transitions between 60 Hz and 90 Hz when the luminance of the display panel is low. But an issue with these solutions is that the definition of what is considered "low display luminance" can be fairly high. In some example computing devices, the ideal transition threshold to alleviate all flickering has been found to be 75%. In other words, if the luminance of the display panel is at or above 75% of the total possible luminance of the display panel, then transitions between 60 Hz and 90 Hz may be permitted. And if the luminance of the display panel is below 75% of the total possible luminance, then transitions between 60 Hz and 90 Hz may not be permitted. But because users often keep the luminance of the display panel below 75%, minimum benefits of using multiple refresh rates are obtained.

Some techniques described herein address these issues by applying value offsets to default gamma values used by a display panel. After applying these offsets, the luminance of the display panel when operating 60 Hz may become similar to the luminance of the display panel when operating at 90 Hz, and thus the visual flicker that occurs when switching between 60 Hz and 90 Hz may become less pronounced. To facilitate this, a computing device may determine a difference in luminance of its display panel between 60 Hz and 90 Hz for an input gray level. Then, based on the difference, the computing device could apply a value offset to a default gamma value used by the display panel for the input gray level when the display panel is operating at 90 Hz, thereby generating a new gamma value. The computing device could then override the default gamma value for the input gray level with the new gamma value when the display panel is operating at 90 Hz.

By using the herein-described techniques, multiple refresh rates can be utilized while reducing or eliminating any flickering effect. Other advantages are also contemplated and will be appreciated from the discussion herein.

II. Example Devices

FIG. 1 illustrates computing device 100, in accordance with example embodiments. Computing device 100 includes display panel 110, gamma circuitry 120, one or more ambient light sensors 130, one or more other sensors 140, network interface 150, and controller 160. In some examples, computing device 100 may take the form of a desktop device, a server device, or a mobile device. Computing device 100 may be configured to interact with an environment. For example, computing device 100 may obtain environmental state measurements associated with an environment around computing device 100 (e.g., temperature measurements, ambient light measurements, etc.).

Display panel 110 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display panel 110 may also be configured to generate audible outputs, such as with a speaker, speaker jack, audio output port, audio output device, earphones, and/or other similar devices. Display panel 110 may further be configured with one or more haptic components that can generate haptic outputs, such as vibrations and/or other outputs detectable by touch and/or physical contact with computing device 100.

In example embodiments, display panel 110 is configured to provide output signals at a given refresh rate. The refresh rate may correspond to the number of times display panel 110 updates with new content each second. For example, a 60 Hz refresh rate may mean that display panel 110 updates 60 times per second. In example embodiments, display panel 110 may operate at a 60 Hz, a 90 Hz, or a 120 Hz refresh rate, among other possibilities.

In certain embodiments, display panel 110 may be a color display utilizing a plurality of color channels for generating images. For example, display panel 110 may utilize red, green, and blue (RGB) color channels, or cyan, magenta, yellow, and black (CMYK) color channels, among other possibilities. As further described below, gamma circuitry 120 may adjust the gamma characteristics for each of the color channels of display panel 110.

In some embodiments, display panel 110 may include a plurality of pixels disposed in a pixel array defining a plurality of rows and columns. For example, if display panel 110 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display panel 110 may receive image data from controller 160 and correspondingly send signals to its pixel array in order to display the image data. To send image data to display panel 110, controller 160 may first convert a digital image into numerical data that can be interpreted by display panel 110. For instance, a digital image may contain various image pixels that correspond to respective pixels of display panel 110. Each image pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display panel 110 may provide 256 gray levels, with a numerical value of 0 corresponding to full black and a numerical value of 255 corresponding to full white. As a more specific example, controller 160 may provide to display panel 110 a digital image stream containing 24 bits, with 8 bits corresponding to a gray level for each of the red, green, and blue color channels of a pixel group.

In some cases, the luminance characteristics of images displayed by display panel 110 may be depicted inaccurately when perceived by users. Such inaccuracies may result from the non-linear response of the human eye and could cause inaccurate portrayals of color/luminance on display panel 110 from the viewpoint of users. To compensate for such inaccuracies, computing device 100 could use gamma circuitry 120.

Gamma circuitry 120 may include circuitry that could compensate for inaccuracies that occur when displaying images on display panel 110. To do this, gamma circuitry may include memory for storing one or more gamma curves/tables. The values in each curve/table may be determined based upon the transmittance sensitivities of display panel 110 over a range of input gray levels.

Figure 2A:
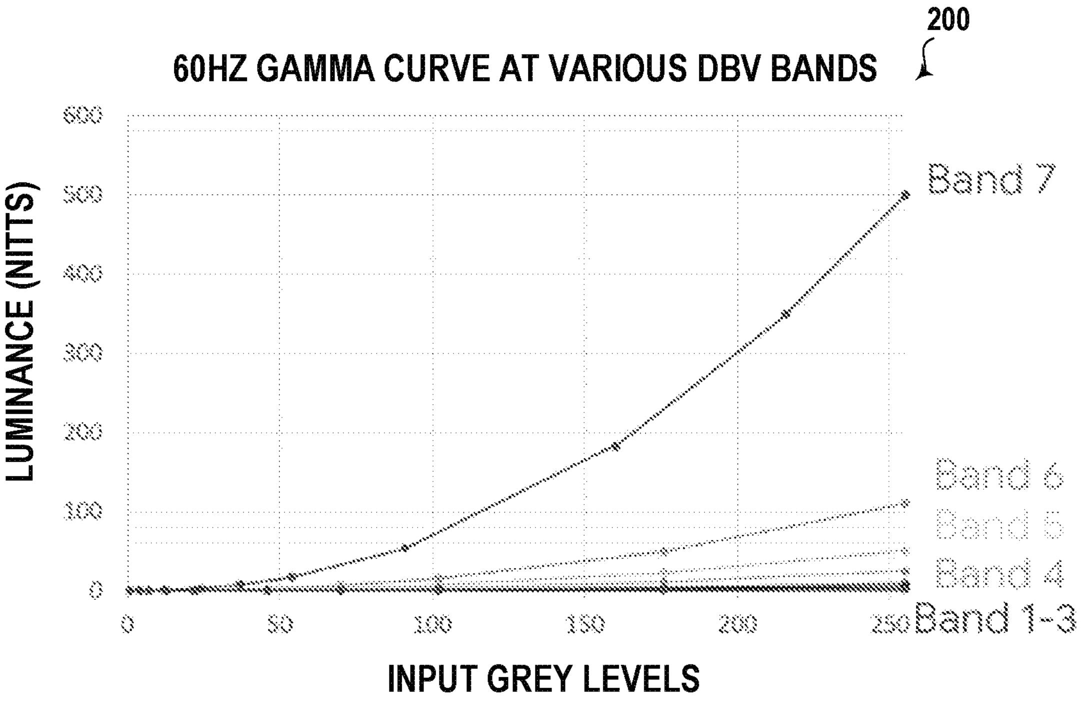
FIG. 2A is a graph illustrating 60 Hz gamma curves for various DBV bands, in accordance with example embodiments.

As an illustrative example, FIG. 2A depicts graph 200 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display panel 110. Based on that maximum brightness, display panel 110 may choose a corresponding DBV band (and thus a corresponding gamma curve) to compensate for inaccuracies that occur when displaying images.

As shown in graph 200, each gamma curve includes a relationship between input gray levels (on the x-axis) and luminance of a viewable image displayed on display panel 110 (on the y-axis). These relationships are non-linear. For instance, in band 7, an input gray level of 200 corresponds to a luminance value of 300 nits. Consequently, by using a gamma curve to adjust input gray levels, the images displayed on display panel 110 may exhibit a non-linear luminance to input gray level relationship. Yet, when viewed by a user, the response of the human eye may cause the user to perceive the displayed images as having a linear relationship between luminance and input gray level. Thus, by using gamma curves, display panel 110 is able to produce images that may be perceived by a user as having a generally linear relationship with regard to input gray level and luminance.

Figure 2B:
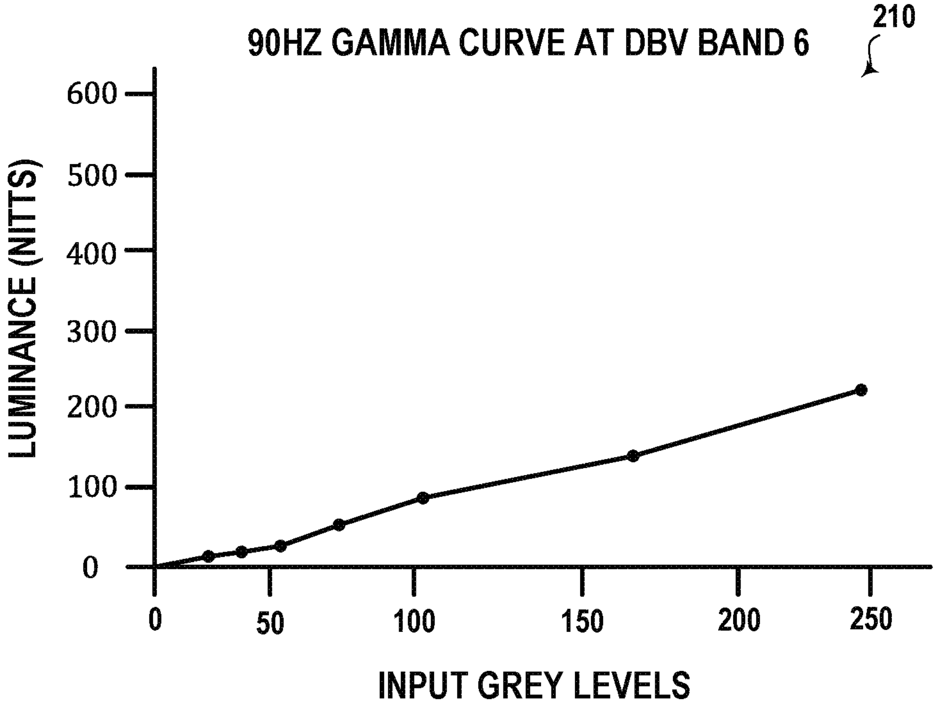
FIG. 2B is a graph illustrating a 90 Hz gamma curve for DBV band 6, in accordance with example embodiments.

Display panel 110 could use different gamma curves depending on whether display panel 110 is operating at a first refresh rate (e.g., 60 Hz) or at a second refresh rate (e.g., 90 Hz). For instance, display panel 110 may utilize the gamma curves shown in graph 200 when it is operating at 60 Hz. On the other hand, display panel 110 may utilize the gamma curve shown in graph 210 of FIG. 2B when it is operating at 90 Hz. For the purpose of clarity, graph 210 only includes the gamma curve for DBV band 6. However, it should be noted that graph 210 could contain other gamma curves for other DBV bands as well.

The gamma curves for 60 Hz may differ from the gamma curves for 90 Hz. For example, the gamma curve for DBV band 6 in graph 200 differs from the gamma curve for DBV band 6 in graph 210. More specifically, the gamma curve for DBV band 6 in graph 210 has, on average, higher luminance values for input gray levels than the gamma curve for DBV band 6 in graph 200. In line with the discussion above, this difference may cause a visual flicker to manifest on display panel 110 when display panel 110 transitions between 60 Hz to 90 Hz (and vice versa). Consequently, if the display panel 110 frequently switches between 60 Hz and 90 Hz refresh rates, the visual flicker may become highly pronounced and detrimental to a user's experience. Further, because human eyes are highly sensitive at low luminance settings, the visual flicker is especially noticeable when the luminance of display panel 110 is low.

Figure 3:
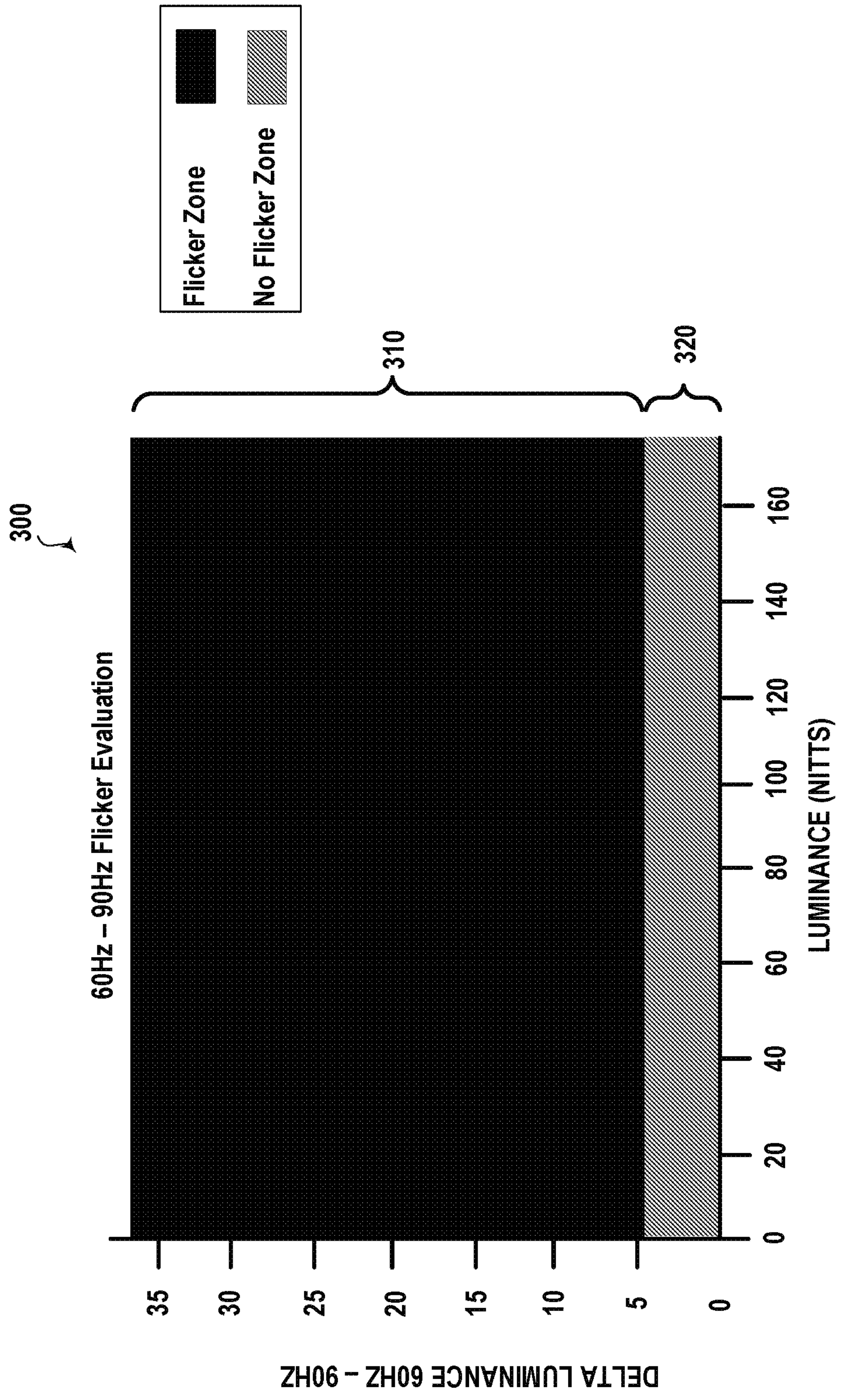
FIG. 3 is a graph illustrating flickering and non-flickering zones, in accordance with example embodiments.

A further explanation of this visual flicker is illustrated by graph 300 in FIG. 3. The x-axis of graph 300 may correspond to the luminance of display panel 110. The y-axis of graph 300 may correspond to a difference between the luminance of display panel 110 when operating at a first refresh rate (e.g., 60 Hz) versus when operating at a second refresh rate (e.g., 90 Hz). The difference in luminance may also be referred to herein as a "delta luminance" and could be measured as a percentage difference.

Graph 300 includes two separate zones: flicker zone 310 and no flicker zone 320. Flicker zone 310 shows that when delta luminance is greater than 5% (e.g., in flicker zone 310), visual flickering becomes highly conspicuous and detrimental to a user's experience. No flicker zone 320 shows that when delta luminance is less than 5% (e.g., in no flicker zone 320), flicker becomes unproblematic and acceptable, and a user may not notice any flickering effect when the refresh rate of display panel 110 changes between 60 Hz and 90 Hz. Consequently, it may be desirable to modify the delta luminance of display panel 110 to be less than 5% so that refresh rate changes will not be conspicuous to users.

Returning back to FIG. 1, ambient light sensor(s) 130 may be configured to receive light from an environment of (e.g., within 1 meter (m), 5 m, or 10 m of) computing device 100. Ambient light sensor(s) 130 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 130 may include indium gallium arsenide (InGaAs) APDs configured to detect light at wavelengths around 1550 nanometers (nm). Other types of ambient light sensor(s) 130 are possible and contemplated herein.

In some embodiments, ambient light sensor(s) 130 may include a plurality of photodetector elements disposed in a one-dimensional array or a two-dimensional array. For example, ambient light sensor(s) 130 may include sixteen detector elements arranged in a single column (e.g., a linear array). The detector elements could be arranged along, or could be at least parallel to, a primary axis.

In some embodiments, computing device 100 can include one or more other sensors 140. Other sensor(s) 140 can be configured to measure conditions within computing device 100 and/or conditions in an environment of (e.g., within 1 m, 5 m, or 10 m of) computing device 100 and provide data about these conditions. For example, other sensor(s) 140 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 140 are possible as well.

Data gathered from ambient light sensors(s) 130 and other sensor(s) 140 may be communicated to controller 160, which may use the data to perform one or more actions.

Network interface 150 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 150 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 160 may include one or more processors 162 and memory 164. Processor(s) 162 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 162 may be configured to execute computer-readable instructions that are contained in memory 164 and/or other instructions as described herein.

Memory 164 may include one or more non-transitory computer-readable storage media that can be read and/or accessed by processor(s) 162. The one or more non-transitory computer-readable storage media can include volatile and/or non-volatile storage components, such as optical, magnetic, organic or other memory or disc storage, which can be integrated in whole or in part with at least one of processor(s) 162. In some examples, memory 164 can be implemented using a single physical device (e.g., one optical, magnetic, organic or other memory or disc storage unit), while in other examples, memory 164 can be implemented using two or more physical devices.

In example embodiments, processor(s) 162 are configured to execute instructions stored in memory 164 so as to carry out operations.

The operations may include transitioning display panel 110 from a first refresh rate to a second refresh rate. For example, controller 160 may transition display panel 110 from a 60 Hz refresh rate to a 90 Hz refresh rate, or vice versa.

The operations may further include receiving at least one of a measured difference in luminance or a measured difference in color of display panel 110 between the first refresh rate and the second refresh rate for an input gray level. In some implementations, this may involve receiving the at least one measured difference from a spectroradiometer or a colorimeter that is part of computing device 100. In other implementations, this may involve receiving the at least one measured difference from a second computing device communicatively coupled to computing device 100 (e.g., via network interface 150). In some cases, the second computing device includes one of a spectroradiometer or a colorimeter.

The operations may also include applying, based on the at least one measured difference, a value offset to a default gamma value used by computing device 100 for the input gray level when display panel 110 is operating at the second refresh rate, thereby generating a new gamma value. In some implementations, rather than applying the value offset to generate a new gamma value, computing device 100 may instead receive, from the second computing device, the new gamma value, where the second computing device is configured to apply, based on the at least one measured difference, the value offset to the default gamma value used by computing device 100 for the input gray level when display panel 110 is operating at the second refresh rate.

The operations may also include storing the new gamma value. For example, computing device 100 may store the new gamma value in memory 164, in gamma circuitry 120, or perhaps in another location. In some implementations, the storing may include storing the new gamma value into a boot image of computing device 100. The boot image may include software and related data to allow computing device 100 to be powered on; i.e., be booted.

The operations may also include, subsequent to the storing, overriding the default gamma value for the input gray level with the new gamma value when display panel 110 is operating at the second refresh rate. In some implementations, the overriding occurs when computing device 100 is initially powered on; i.e., booted.

III. Example Techniques for Determining New Gamma Values

FIG. 4 depicts gamma table 400 and gamma table 410, in accordance with example embodiments. In line with the discussion above, computing device 100 could use gamma table 400 and 410 to compensate for inaccuracies that may occur when displaying images on display panel 110. Both gamma table 400 and 410 could be stored within gamma circuitry 120. In examples herein, computing device 100 may utilize gamma table 400 when display panel 110 is operating at a first refresh rate (e.g., 60 Hz), and may utilize gamma table 410 when display panel 110 is operating at a second refresh rate (e.g., 90 Hz).

As shown, the gamma values in gamma table 400 may differ from the gamma values in gamma table 410. For instance, tap point 402, which includes an optical property (e.g., in luminance or color) for DVB band 7 and input gray level G7 when display panel 110 is operating at 60 Hz, has a value of 0.172. In contrast, tap point 412, which includes an optical property (e.g., in luminance or color) for DVB band 7 and input gray level G7 when display panel 110 is operating at 90 Hz, has a value of 0.184. As discussed above, the differences between gamma values at corresponding tap points of gamma table 400 and 410 (e.g., 0.184−0.172=0.012) are considered herein as "delta luminances."

To make refresh rate changes between 60 Hz and 90 hz appear less conspicuous to users, it may be desirable to modify the gamma values in gamma table 410 (or gamma table 400) so that the delta luminances between 60 Hz and 90 Hz, on average, decrease across all input gray levels. Because human eyes are highly sensitive to changes at low luminance settings, some embodiments may involve modifying gamma values only for threshold low input gray levels; for instance, only for input gray levels at or below G48.

To modify gamma values s of tap points in gamma table 410, some implementations involve altering one or more register values in gamma circuitry 120. For instance, gamma circuitry 120 could include a set of hardware registers for each tap point in gamma table 410. Gamma circuitry 120 could use the values in these registers to alter the input gray levels signals sent by controller 160 to display panel 110. Generally speaking, the number of hardware registers for a given tap point corresponds to the number of color channels used by display panel 110. For example, if display panel 110 used RGB color channels, then gamma circuitry 120 may contain three hardware registers for a given tap point, each of the three registers corresponding to one of the RGB color channels.

Figure 5:
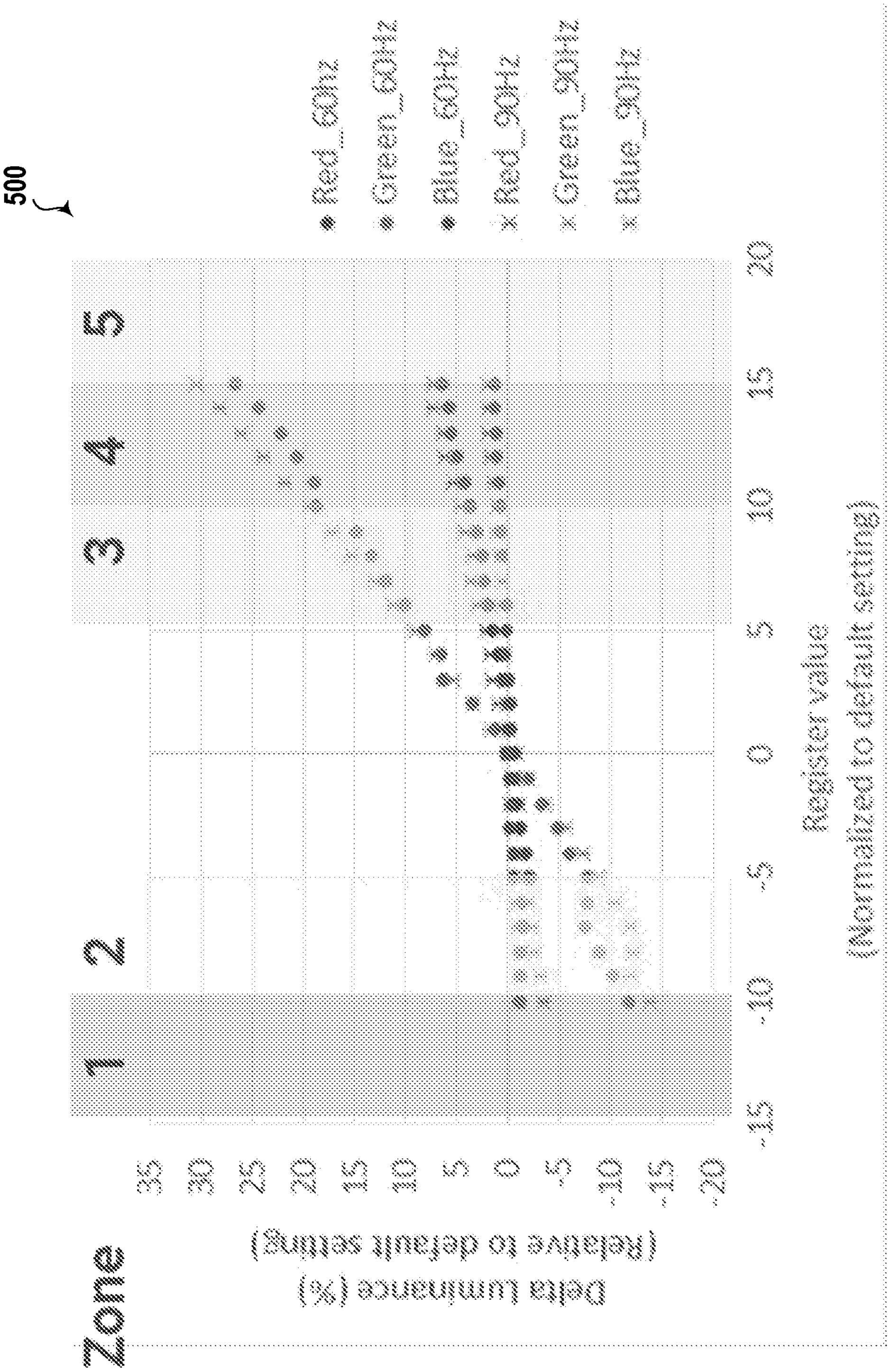
FIG. 5 is a graph containing relationships between RGB register values and delta luminance values, in accordance with example embodiments.

As an illustrative example, FIG. 5 depicts graph 500 that includes register values on the x-axis and delta luminance values on the y-axis. Various trend lines appear on graph 500. Each of these trend lines captures a specific relationship between the register values and delta luminance values for (i) a given color channel and (ii) a given refresh rate. For instance, the green trend line with circular dots captures a relationship between register values and delta luminance values for the green color channel at refresh rate 60 Hz. On the other hand, the green line with asterisk marks captures a relationship between register values and delta luminance values for the green color channel at refresh rate 90 Hz. These relationships may be default relationships that are configured by the manufacturer of display panel 110.

In order to modify gamma values in gamma table 410, an offset could be applied so that, for a given color channel, the register values at refresh rate 60 Hz become similar to the register values at refresh rate 90 Hz. The magnitude of this offset may be determined based on the trend lines depicted in graph 500. For example, if the delta luminance between 60 Hz and 90 Hz for an input gray level is 25%, then the register value for the green color channel at 90 Hz is shown in graph 500 to be significantly higher than the register value for the green color channel at 60 Hz. Thus, a larger offset may be applied. Alternatively, if the delta luminance between 60 Hz and 90 Hz for an input gray level is 10%, then the register value for the green color channel at 90 Hz is shown to be relatively similar to the register value for the green color channel at 60 Hz, and thus a smaller offset value may be applied.

Because the magnitudes of offset may differ depending on the delta luminance for an input gray level, some embodiments involve a series of offset tables that detail the offset value that should be applied for various delta luminances. In some implementations, these offset tables are determined based on analysis of devices that contain similar display panels to display panel 110 (perhaps devices that were developed by the same manufacturer that developed display panel 110).

FIG. 6 includes various example offset tables, in accordance with example embodiments. Namely, FIG. 6 includes four offset tables: offset table 610, offset table 620, offset table 630, and offset table 640. Each of these offset tables could be used to identify the offset values that should be applied for various delta luminances in delta luminance table 600, where delta luminance table 600 captures the delta luminances between gamma table 400 and gamma table 410 from FIG. 4.

For example, delta luminance 602 is the delta luminance for DVB band 4/input gray level G15. Upon determining that the value for delta luminance 602 is −15.446, offset table 620 could be used to determine that the value of −15.446 falls in the range [−15.5, −13], and thus an offset value of 1 should be applied to the green color channel register value of DVB band 4/input gray level G15 at 90 Hz. As another example, delta luminance 604 is the delta luminance for DVB band 2/input gray level G15. Upon determining that the value for delta luminance 604 is 12.67, offset table 640 could be used to determine that the value of 12.67 falls in the range [7, 14], and thus an offset value of −1 should be applied to the green color channel register of DVB band 2/input gray level G15 at 90 Hz, an offset value of 1 should be applied to the red color channel register of DVB band 2/input gray level G15 at 90 Hz, and an offset value of 1 should be applied to the blue color channel register of DVB band 2/input gray level G15 at 90 Hz.

In some embodiments, the process of updating register values for an input gray level occurs until the delta luminance for the input gray level is less than a predefined threshold. In some examples, the predefined threshold in a range between 5% and 95%. For instance the predefined threshold may be 5%, 10%, or 90%. In certain embodiments, the process of updating register values for an input gray level occurs until: (i) the delta luminance for the input gray level is less than a predefined threshold, and (ii) the delta color difference for the input gray level is less than a predefined color threshold, where the color difference is measured as a linear combination of the squared difference between the u' at 90 Hz and at 60 Hz and the squared difference between the v' at 90 Hz and at 60 Hz, where u' and v' are color coordinates in CIELUV color space. In some examples, the predefined color threshold is 0.4%

IV. Example Methods

Figure 7:
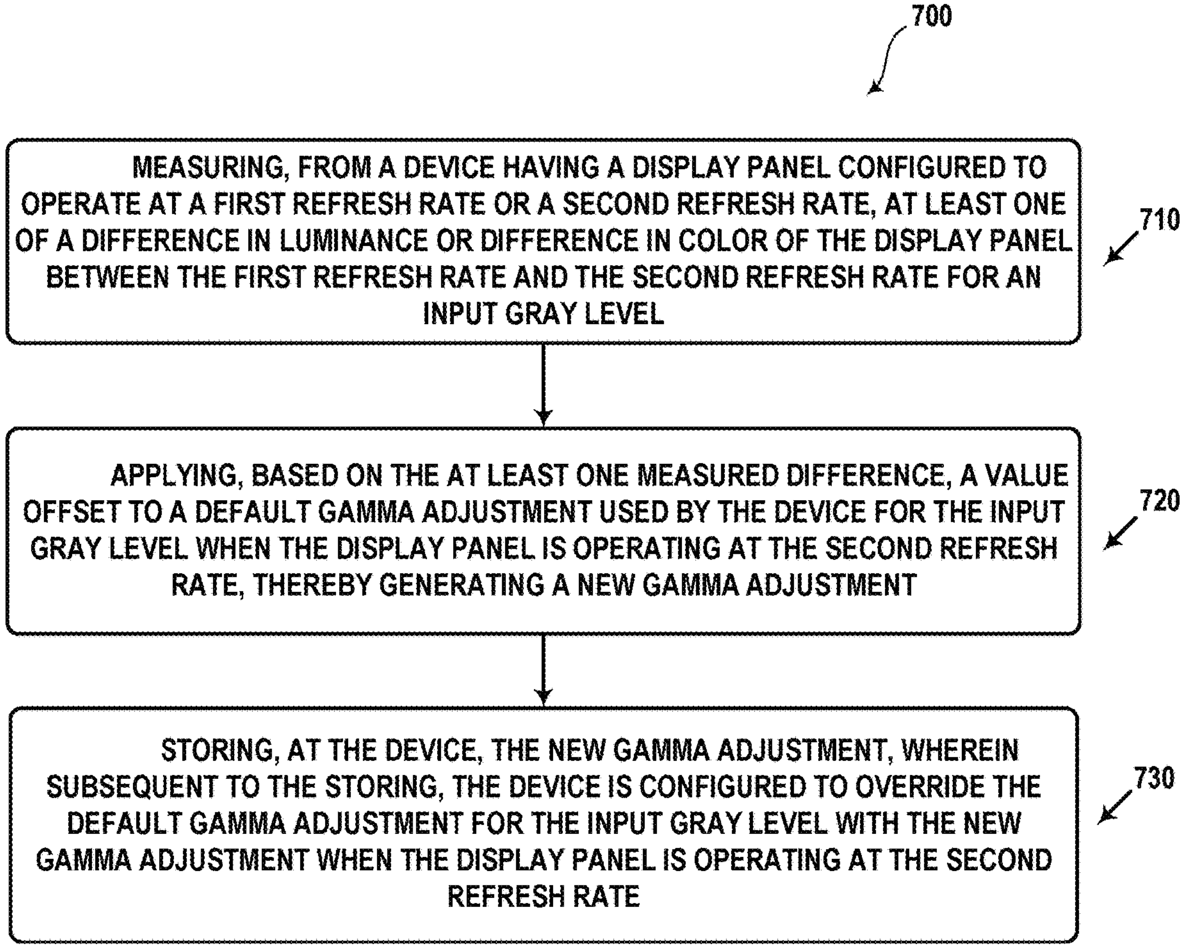
FIG. 7 illustrates a method, in accordance with example embodiments.

FIG. 7 illustrates a method 700, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700.

Some or all of the blocks of method 700 may be carried out by various elements of computing device 100. Alternatively and/or additionally, some or all of the blocks of method 700 may be carried out by a computing device that is communicatively coupled to computing device 100. Furthermore, some implementations of method 700 may utilize the relationships depicted in graphs and/or tables that are illustrated and described with regard to FIGS. 2A, 2B, 3, 4, 5, and 6.

Block 710 includes measuring, from a device having a display panel configured to operate at a first refresh rate or a second refresh rate, at least one of a difference in luminance or a difference in color of the display panel between the first refresh rate and the second refresh rate for an input gray level;

Block 720 includes applying, based on the at least one measured difference, a value offset to a default gamma value used by the device for the input gray level when the display panel is operating at the second refresh rate, thereby generating a new gamma value; and Block 730 includes storing, at the device, the new gamma value, wherein subsequent to the storing, the device is configured to override the default gamma value for the input gray level with the new gamma when the display panel is operating at the second refresh rate.

In some embodiments, the display panel has a plurality of color channels, the default gamma value comprises respective register values for the plurality of color channels, and the value offset comprises an offset to at least one of the register values of the default gamma value.

In some embodiments, the plurality of color channels comprise red, green and blue (RGB) color channels.

Some embodiments involve making a determination that at least one of a second measured difference in luminance or a second measured difference in color of the display panel between the first refresh rate and the second refresh rate for the input gray level is greater than a predefined threshold. Such embodiments may also involve in response to the determination, applying, based on the at least one second measured difference, a second value offset to the new gamma value, thereby generating a second new gamma value. Such embodiments may further involve storing, at the device, the second new gamma value, where subsequent to storing the second new gamma value, the device is configured to override the default gamma value for the input gray level with the second new gamma value when the display panel is operating at the second refresh rate.

In some embodiments, differences in luminance and differences in color of the display panel are measured as percentage differences, and wherein the predefined threshold is in range between 5% and 95%.

Some embodiments involve measuring, from the device, at least one of a second difference in luminance or a second difference in color of the display panel between the first refresh rate and the second refresh rate for a second input gray level. Such embodiments may also involve applying, based on the at least one second measured difference, a second value offset to a second default gamma value used by the device for the second input gray level when the display panel is operating at the second refresh rate, thereby generating a second new gamma value. Such embodiments may further involve storing, at the device, the second new gamma value, where subsequent to storing the second new gamma value, the device is configured to override the second default gamma value for the second input gray level with the second new gamma value when the display panel is operating at the second refresh rate.

In some embodiments, the device is configured with multiple gamma correction curves, and the first and second default gamma value are determined from a same gamma correction curve.

In some embodiments, the device is configured with multiple gamma correction curves, and the first and second default gamma value are determined from different gamma correction curves.

In some embodiments, the input gray level is a threshold low gray level.

In some embodiments, the measuring and applying are performed by the device.

In some embodiments, the measuring and applying are performed by a second device communicatively coupled to the device.

In some embodiments, the measuring is performed by a second device communicatively coupled to the device, and wherein the applying is performed by the device.

In some embodiments, the first refresh rate is 60 Hz and wherein the second refresh rate is 90 Hz.

In some embodiments, the storing comprises storing the new gamma value in a boot image of the device.

In some embodiments, the value offset is determined, at least in part, based on a default gamma value used by the device for the input gray level when the display panel is operating at the first refresh rate.

Some embodiments involve determining, based on the at least one measured difference and from a set of mappings between: (i) differences in luminance or differences in color, and (ii) value offsets, the value offset.

In some embodiments, the differences in luminance are grouped into buckets, and wherein luminance differences in each bucket map to a same value offset.

In some embodiments, the buckets are determined based on magnitudes of differences in luminance.

In some embodiments, the differences in color are grouped into buckets, and wherein color differences in each bucket map to a same value offset.

In some embodiments, the buckets are determined based on magnitudes of differences in color.

In some embodiments, the set of mappings are determined based on analysis of a group of devices that are related to the device.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:

measuring, from a device having a display panel configured to operate at a first refresh rate or a second refresh rate, a difference in luminance of the display panel between the first refresh rate and the second refresh rate for an input gray level;

applying, based on the measured difference in luminance, a value offset to a first default gamma value used by the device for the input gray level when the display panel is operating at the second refresh rate, thereby generating a new gamma value; and modifying the first default gamma value by storing, at the device, the new gamma value wherein subsequent to the storing, the device is configured to override the first default gamma value for the input gray level with the new gamma value when the display panel is operating at the second refresh rate, and wherein modifying gamma values comprises applying value offsets to be applied for various differences in luminance, wherein the differences in luminance are grouped into buckets, and wherein luminance differences in each bucket map to a same offset value.

2. The method of claim 1, further comprising:

measuring a difference in color of the display panel between the first refresh rate and the second refresh rate for the input gray level;

making a determination that at least one of a second measured difference in luminance or a second measured difference in color of the display panel between the first refresh rate and the second refresh rate for the input gray level is greater than a predefined threshold;

in response to the determination, applying, based on the at least one second measured difference, a second value offset to the new gamma value, thereby generating a second new gamma value; and storing, at the device, the second new gamma value, wherein subsequent to storing the second new gamma value, the device is configured to override the first default gamma value for the input gray level with the second new gamma value when the display panel is operating at the second refresh rate.

3. The method of claim 2, wherein the display panel has a plurality of color channels, wherein the first default gamma value comprises respective register values for the plurality of color channels, and wherein the value offset comprises an offset to at least one of the respective register values of the first default gamma value.

4. The method of claim 3, wherein the plurality of color channels comprise red, green and blue (RGB) color channels.

5. The method of claim 2, wherein differences in luminance and differences in color of the display panel are measured as percentage differences, and wherein the predefined threshold is in range between 5% and 95%.

6. The method of claim 2, further comprising:

measuring, from the device, at least one of a second difference in luminance or a second difference in color of the display panel between the first refresh rate and the second refresh rate for a second input gray level;

applying, based on the at least one second measured difference, a second value offset to a second default gamma value used by the device for the second input gray level when the display panel is operating at the second refresh rate, thereby generating a second new gamma value; and storing, at the device, the second new gamma value, wherein subsequent to storing the second new gamma value, the device is configured to override the second default gamma value for the second input gray level with the second new gamma value when the display panel is operating at the second refresh rate.

7. The method of claim 6, wherein the device is configured with multiple gamma correction curves, and wherein the first and second default gamma values are determined from a same gamma correction curve.

8. The method of claim 6, wherein the device is configured with multiple gamma correction curves, and wherein the first and second default gamma values are determined from different gamma correction curves.

9. The method of claim 1, wherein the input gray level is a threshold low gray level.

10. The method of claim 1, wherein the measuring and applying are performed by the device.

11. The method of claim 1, wherein the measuring and applying are performed by a second device communicatively coupled to the device.

12. The method of claim 1, wherein the measuring is performed by a second device communicatively coupled to the device, and wherein the applying is performed by the device.

13. The method of claim 1, wherein the first refresh rate is 60 Hz and wherein the second refresh rate is 90 Hz.

14. The method of claim 1, wherein the storing comprises storing the new gamma value in a boot image of the device.

15. The method of claim 1, wherein the value offset is determined, at least in part, based on the first default gamma value used by the device for the input gray level when the display panel is operating at the first refresh rate.

16. The method of claim 1, further comprising:

determining, based on a measured difference in luminance and from a set of mappings between: (i) differences in luminance or differences in color, and (ii) value offsets, the value offset.

17. The method of claim 16, wherein the differences in luminance are grouped into buckets, and wherein luminance differences in each bucket map to a same value offset.

18. The method of claim 17, wherein the buckets are determined based on magnitudes of differences in luminance.

19. The method of claim 16, wherein the differences in color are grouped into buckets, and wherein color differences in each bucket map to a same value offset.

20. The method of claim 19, wherein the buckets are determined based on magnitudes of differences in color.

21. The method of claim 16, wherein the set of mappings are determined based on analysis of a group of devices that are related to the device.

22. A system comprising:

one or more processors; and data storage, wherein the data storage has stored thereon computer-executable instructions that, when executed by the one or more processors, cause the system to carry out operations comprising:

measuring, from a device having a display panel configured to operate at a first refresh rate or a second refresh rate, a difference in luminance of the display panel between the first refresh rate and the second refresh rate for an input gray level;

applying, based on the measured difference in luminance, a value offset to a first default gamma value used by the device for the input gray level when the display panel is operating at the second refresh rate, thereby generating a new gamma value; and modifying the first default gamma value by storing, at the device, the new gamma value wherein subsequent to the storing, the device is configured to override the first default gamma value for the input gray level with the new gamma value when the display panel is operating at the second refresh rate, and wherein modifying gamma values comprises applying value offsets to be applied for various differences in luminance, wherein the differences in luminance are grouped into buckets, and wherein luminance differences in each bucket map to a same offset value.

23. A device comprising:

a display panel configured to operate at a first refresh rate or a second refresh rate;

one or more processors; and data storage, wherein the data storage has stored thereon computer-executable instructions that, when executed by the one or more processors, cause the device to carry out operations comprising:

measuring, from the device, a difference in luminance of the display panel between the first refresh rate and the second refresh rate for an input gray level;

applying, based on the measured difference in luminance, a value offset to a first default gamma value used by the device for the input gray level when the display panel is operating at the second refresh rate, thereby generating a new gamma value; and modifying the first default gamma value by storing, at the device, the new gamma value wherein subsequent to the storing, the device is configured to override the first default gamma value for the input gray level with the new gamma value when the display panel is operating at the second refresh rate, and wherein modifying gamma values comprises applying value offsets to be applied for various differences in luminance, wherein the differences in luminance are grouped into buckets, and wherein luminance differences in each bucket map to a same offset value.

* * * * *